United States Patent
Hamilton, II et al.

(10) Patent No.: US 8,640,088 B2
(45) Date of Patent: Jan. 28, 2014

(54) SOFTWARE REUSE UTILIZING NAIVE GROUP ANNOTATION OF INCOMPLETE SOFTWARE DESCRIPTIONS EMPLOYING A SELF-REPORTING ELEMENT

(75) Inventors: Rick Allen Hamilton, II, Charlottesville, VA (US); James Robert Kozloski, New Fairfield, CT (US); Brian Marshall O'Connell, Cary, NC (US); Alan Clifford Pickover, Yorktown Heights, NY (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 997 days.

(21) Appl. No.: 12/691,634

(22) Filed: Jan. 21, 2010

(65) Prior Publication Data

US 2011/0179396 A1    Jul. 21, 2011

(51) Int. Cl.
 G06F 9/44       (2006.01)
 G06F 12/14      (2006.01)

(52) U.S. Cl.
 USPC .............. 717/106; 717/100; 713/190

(58) Field of Classification Search
 None
 See application file for complete search history.

(56) References Cited

U.S. PATENT DOCUMENTS

| | | | | |
|---|---|---|---|---|
| 5,485,601 A * | 1/1996 | Ching | ............ | 717/106 |
| 6,643,775 B1 * | 11/2003 | Granger et al. | ............ | 713/190 |
| 6,877,154 B2 | 4/2005 | Nagashima | | |
| 7,340,734 B1 * | 3/2008 | de Waal | ............ | 717/159 |
| 7,386,831 B2 * | 6/2008 | Flanagan | ............ | 717/103 |
| 7,627,861 B2 * | 12/2009 | Smith et al. | ............ | 717/144 |
| 7,716,634 B2 * | 5/2010 | Ross et al. | ............ | 717/106 |
| 2004/0003264 A1 * | 1/2004 | Zeman et al. | ............ | 713/190 |
| 2004/0205692 A1 * | 10/2004 | Robinson | ............ | 717/100 |
| 2006/0031686 A1 * | 2/2006 | Atallah et al. | ............ | 713/190 |
| 2006/0095376 A1 * | 5/2006 | Mitchell et al. | ............ | 705/50 |
| 2006/0150144 A1 * | 7/2006 | Balathandapani et al. | ... | 717/106 |
| 2006/0225027 A1 * | 10/2006 | Venkatesh et al. | ............ | 717/100 |
| 2007/0033567 A1 | 2/2007 | Carlson | | |
| 2007/0074158 A1 | 3/2007 | Robinson | | |
| 2007/0220479 A1 * | 9/2007 | Hughes | ............ | 717/100 |
| 2007/0250405 A1 | 10/2007 | Ronen et al. | | |
| 2008/0288914 A1 * | 11/2008 | Schmitter | ............ | 717/101 |
| 2009/0106080 A1 * | 4/2009 | Carrier et al. | ............ | 705/10 |

OTHER PUBLICATIONS

Haefliger et al.Code Reuse in Open Source Software.Management Science, vol. 54, Jan. 2008, pp. 180-193, Retrieved on [Sep. 10, 2013], Retrieved from the Internet: URL< http://mansci.journal.informs.org/content/54/1/180.full.pdf+html>.*
Ahn et al.Utilizing knowledge context in virtual collaborative work. Decision Support Systems, 2005, pp. 563-582, Retrieved on [Sep. 10, 2013] Retrieved from the Internet: URL<http://www.sciencedirect.com/science/article/pii/S0167923604000533#>.*

* cited by examiner

*Primary Examiner* — Thuy Dao
*Assistant Examiner* — Cheneca Smith
(74) *Attorney, Agent, or Firm* — Schmeiser, Olsen & Watts, LLP; Arthur J. Samodovitz

(57) ABSTRACT

Software reuse utilizing naive group annotation of incomplete software descriptions. A software code is decimated whereby the software code's attributes, such as variable, class and method names are obfuscated into non-informative forms. The decimated software code is then presented to two or more participants that include at least one naive and one informed participant. The naive participant(s) poses a predetermined number of question(s) to and receive answer(s) from the informed participant(s). After receiving the answer(s) posed to the informed participant(s), the naive participant(s) proceeds to guess the function of the presented decimated software code. The annotations, i.e., questions and answers, to the decimated software code under review are collected and stored in a database.

20 Claims, 3 Drawing Sheets

SOFTWARE REUSE UTILIZING NAIVE GROUP ANNOTATION OF INCOMPLETE SOFTWARE DESCRIPTIONS EMPLOYING A SELF-REPORTING ELEMENT

FIELD OF THE INVENTION

The present invention is generally related to software development systems and, more particularly, is related to a system and method for software reuse utilizing naive group annotation of incomplete software descriptions employing a self-reporting element.

BACKGROUND OF THE INVENTION

Companies often have the need to better capture, manage, and leverage reusable software assets for both internal and external use and in client engagements. Code reuse, also known as software reuse, is the practice of utilizing existing software, or alternatively, software knowledge to build new software.

Sometimes, isolated code developers may not always be aware of where their code or tools may best be reused. Anticipating future reuse case scenarios for code, software, applications, or applets is one means to address the problem of recognizing existing solutions to developer, user, or customer problems. Recognition is difficult to automate because categories of problems evolve rapidly, and so declared relationships between existing solutions and new problems are almost entirely absent when the need for reuse arises. The novelty a problem presents compared to a past problem in its class usually increases rapidly with time elapsed. However, the reusability of code, software, or other solutions decays more slowly. Therefore the ability to identify reusable solutions (either in the form of code, software, applications, or applets) diminishes with time, even though the value of their reuse largely remains. Therefore, much is lost due to the difficulty in automating the identification of reuse scenarios.

SUMMARY OF THE INVENTION

To address the above-discussed deficiencies in the prior art, the present invention provides a method and system for software reuse utilizing naive group annotation of incomplete software descriptions employing a self-reporting element. A software code is decimated whereby the software code's attributes, such as variable, class and method names are obfuscated into non-informative forms. The decimated software code is then presented to two or more participants that include at least one naive and one informed participant. The naive participant(s) poses a predetermined number of question(s) to and receive answer(s) from the informed participant(s). After receiving the answer(s) posed to the informed participant(s), the naive participant(s) proceeds to guess the function of the presented decimated software code. The annotations, i.e., questions and answers, to the decimated software code under review, and guesses by the naïve participant(s) of a functionality of the decimated software code, are collected and stored in a database. In one embodiment of the present invention, following the question and guess interactions between the participants, a determination is made if one or more partial reverse obfuscation iterations of the decimated software code have been requested. If it is determined that one or more partially reverse obfuscation iterations of the decimated software code has been requested, the decimated software code is partially restored to its original state and presented back to the participants for another interactive question and answer session. The process of partially restoring the decimated software code to its original state and presenting the partially restored software code to the participants for guessing the function of the decimated software code is repeated until the specified number of iterations has been accomplished.

The present invention discloses a novel method to continually update annotations of existing code, software, applications, and applets with probable reuse case scenarios. More particularly, the present invention discloses a method for annotating software for reuse by means of interactions among software developers, software users, services providers, and consultants. In one embodiment of the present invention, the disclosed method provides incomplete software code, incomplete documentation, or an incomplete user interface to naive individuals, who then must guess the function of the software. It should be noted that the term "naive" as utilized in the present invention does not relate specifically to an individual's expertise level but rather that the individuals involved may not be fully knowledgeable with respect to a particular piece of code or software under review or consideration. More complete information is then provided and the software developer, or "informed" participant, answers questions remotely posed by the naive individuals about the software and its function. In this way, a database of text annotation is accrued from naive guesses and questions. The database enables the code or software to subsequently describe its own potential cases for reuse in alternative development or service engagement environments. Alternatively, the generated information, in another advantageous embodiment, may be stored within the reusable code so that the code becomes self-reporting as to its reuse potential.

Additionally, the present invention mitigates the problem of anticipating future reuse case scenarios for code, software, applications, or applets by utilizing a system that utilizes crowd-sourcing techniques that employs a distributed problem solving and production model. In one embodiment of the present invention, the crowd-sourcing generated information may be stored within the reusable code so that the code becomes self-reporting as to its reuse potential. More particularly, the present invention allows naive individuals to annotate code and software utilizing their intuitive faculties while participating in a rewarding experience that generates monetary and/or nonmonetary benefits for the participants.

The present invention provides multiple advantages over conventional techniques to maintain software reuseability. The novel context for such annotation facilitated by the present invention makes the difficult task of imagining future use case scenarios for code and software proceed naturally, without serious effort, and without biases that are often introduced by an overly analytic, compulsory approach to the predictive process. The present invention improves on other conventional methods that impose a requirement on code developers and users to annotate their code and software with future use case scenarios, and, furthermore, is an improvement to similar crowd-sourcing frameworks in that the method disclosed by the present invention applies this framework to the task of anticipating the function of dynamically evolving software, rather than the task of describing static data.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE PREFERRED EMBODIMENT

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

Figure 1:
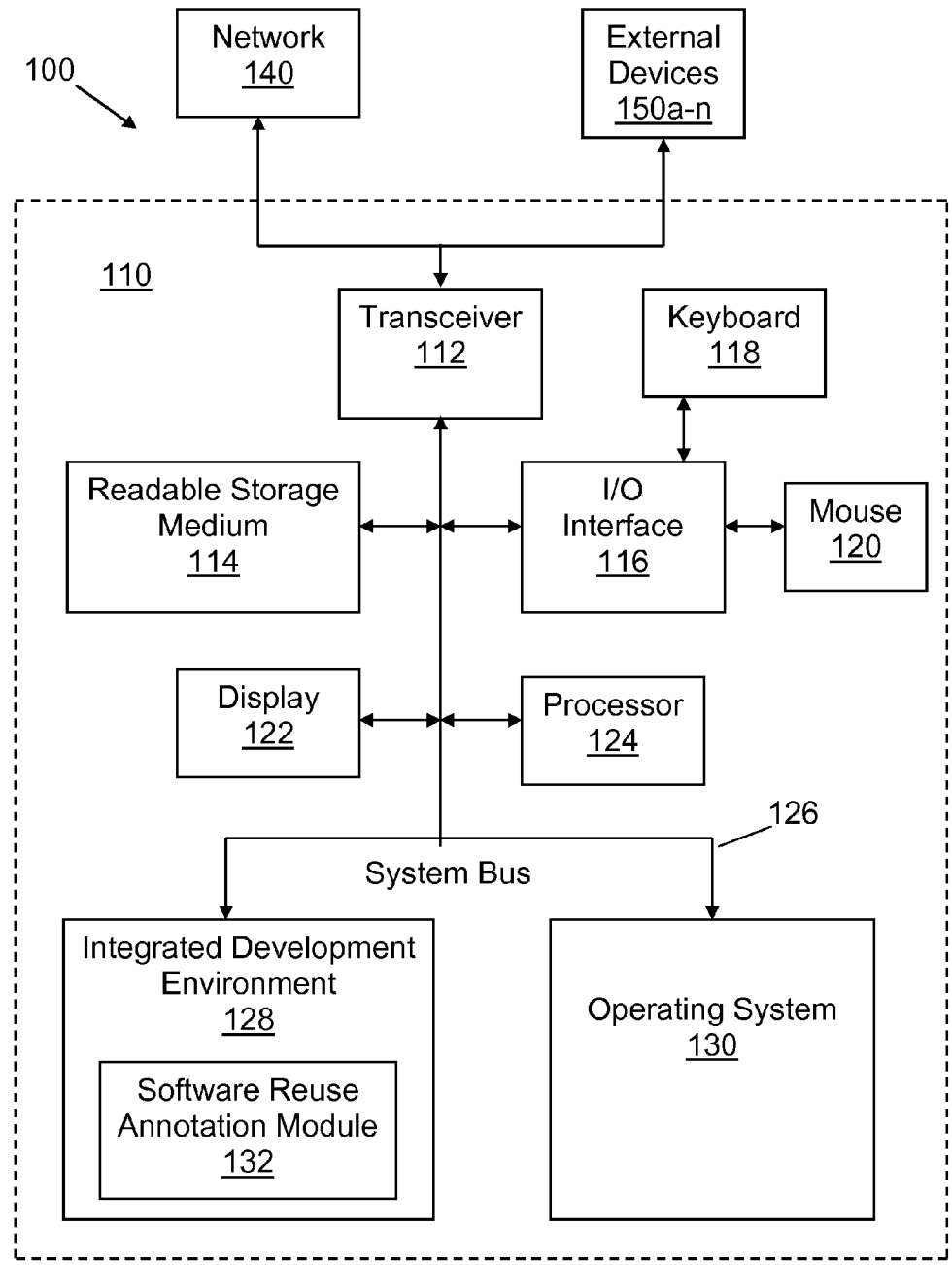
FIG. 1 illustrates a block diagram of a representative data processing system that provides a suitable environment in which the present invention may be implemented.

Referring initially to FIG. 1, there is depicted a block diagram of a representative data processing system 100 that provides a suitable environment in which the present invention may be implemented. Data processing system 100 includes a computer 110, which in turn, includes a processor 124 that is coupled to a system bus 126. A transceiver 112, connected to the system bus 126, enables the computer 110 to connect to a network 140 and to a plurality of external devices 150a-n via wired or wireless mechanisms. A display 122, coupled to the system bus 126, allows for presentation of a general user interface (including text and graphics) for use by a user of the computer 110. The system bus 126 also affords communication with a hardware-based computer readable storage device 114 (e.g., Compact Disk-Read Only Memory (CD-ROM), flash drive memory, etc.). An Input/Output (I/O) Interface 116, also connected to the system bus 126, permits user interaction with the computer 110, such as data entry via a keyboard 118 or a mouse 120.

As shown, the computer 110 also comprises a integrated development environment (IDE) tool 128, such as IBM® Rational® Application Developer, that provides comprehensive facilities for software development. The integrated development environment tool 128 also comprises a software reuse annotation logic module 132 for implementing a self-reporting element for software reuse based on the principles disclosed by the present invention. The elements that constitute the software reuse annotation logic module 132 will be described in greater detail hereinafter with reference to FIG. 2. In an advantageous embodiment, the software reuse annotation logic module 132 includes code for implementing the elements and process flow that will be described in greater detail hereinbelow in conjunction with FIGS. 2-3. The computer 110 also comprises an operating system 130, such as UNIX, coupled to the system bus 126.

As illustrated and described herein, the computer 110 may be a computer system or server having the required hardware components and programmed with the software reuse annotation logic module 132 executing on the processor to provide the functionality of the disclosed invention. However, in other advantageous embodiments, the computer 110 may also be a device that is specifically designed to include the functionality of the software reuse annotation logic module 132, as described herein. The hardware elements depicted in the computer 110 are not intended to be exhaustive, but rather are representative to highlight components required by and/or utilized to implement the present invention. For instance, the computer 110 may include alternate memory storage devices such as magnetic cassettes, Digital Versatile Disks (DVDs), Bernoulli cartridges, and the like. These alternate configurations of components and other variations are intended to be within the spirit and scope of the present invention.

Embodiments within the scope of the present invention also include computer-readable storage devices for carrying or having computer-executable instructions or data structures stored thereon. The term "computer readable storage device" does not encompass a signal propagation media such as a copper cable, optical fiber, or wireless transmission media. By way of example, and not limitation, such computer-readable storage devices can comprise physical (or recordable type) computer-readable media storage devices including RAM, ROM, EEPROM, CD-ROM or other optical disk storage, magnetic disk storage or other magnetic storage devices, or any other tangible storage device which can be used to carry or store desired program code means in the form of computer-executable instructions or data structures and which can be accessed by a general purpose or special purpose computer. Additionally, when information is transferred or provided over a network or another communications connection (either hardwired, wireless, or a combination of hardwired or wireless) to a computer, the computer properly views the connection as a computer-readable storage device. Thus, any such connection is also properly termed a computer-readable storage device. Combinations of the above should also be included within the scope of computer-readable storage devices.

Computer-executable instructions comprise, for example, instructions and data which cause a general purpose computer, special purpose computer, or special purpose processing device to perform a certain function or group of functions. Although the present invention has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Figure 2:
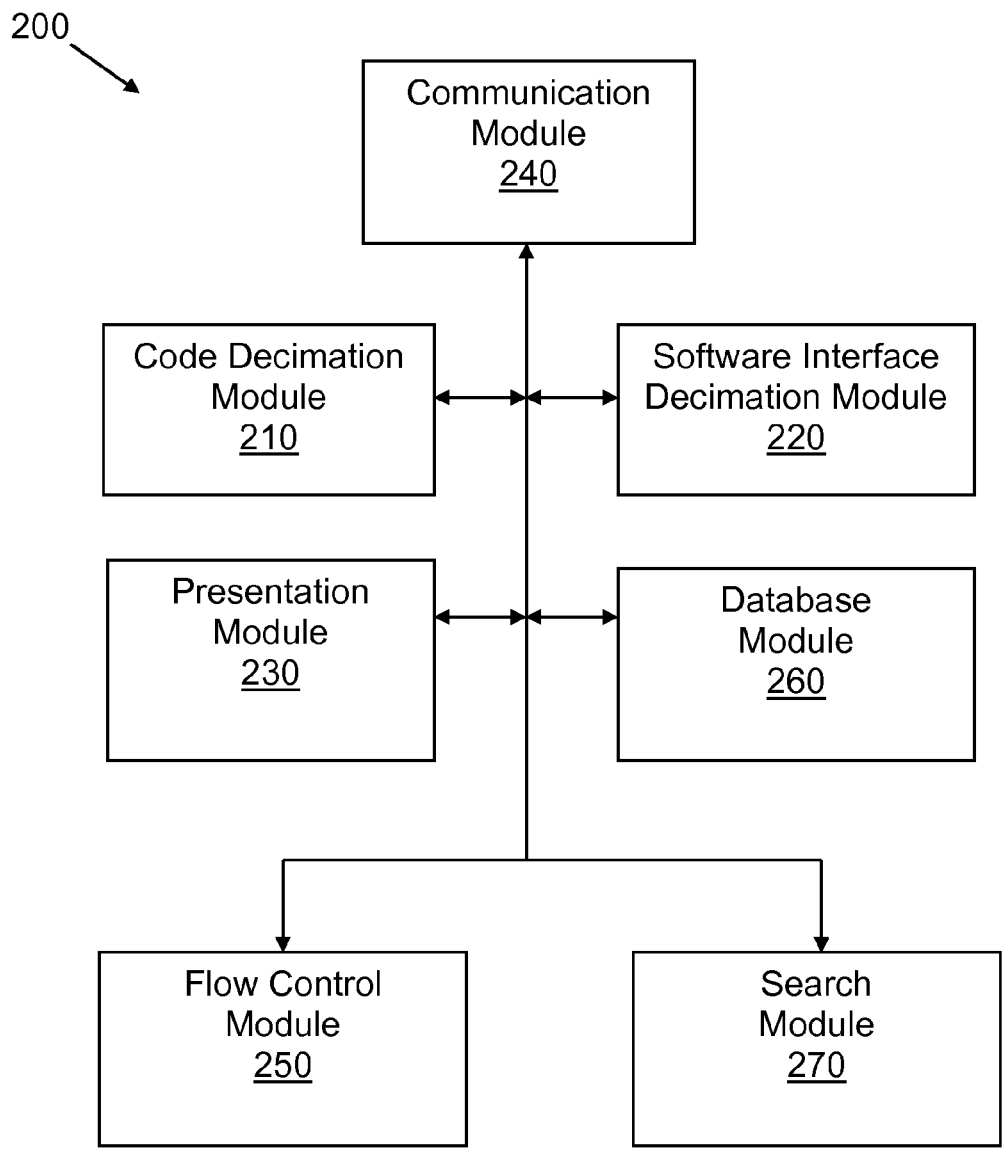
FIG. 2 illustrates an exemplary block diagram representation of an exemplary embodiment of a software reuse annotation logic module according to the principles disclosed by the present invention.

Turning now to FIG. 2, there is illustrated an exemplary embodiment of a software reuse annotation logic module 200 according to the principles disclosed by the present invention. As shown, the software reuse annotation logic module 200 comprises the following constituent modules: a code decimation module 210, a software interface decimation module 220, a presentation module 230, a communication module 240, a flow control module 250, a data base module 260 and a search module 270.

The code decimation module 210 performs name-mangling and syntax-driven decimation of source code written in some computer language, for example C, C++, Java, SQL, FORTRAN, etc. Java is a trademark of Sun Microsystems, Inc. in the United States, or countries, or both. The code decimation module 210 also maintains parsing and decimation capabilities to achieve decimation based on a standardize form of developer annotation. In this case, code developers may specify how a code is to be decimated for future exercises involving naive participants. Thus, the code developers can control how code will be presented to these participants, without actually annotating the code's function directly. The code decimation module 210 parses these annotations and decimates the code accordingly. The steps of decimation are recorded and utilized subsequently for reverse decimation, in which code is restored to its original state in a stepwise fashion.

The software interface decimation module 220 is utilized for removing and/or hiding portions of a user interface, name-mangling text presented in the interface, and/or disrupting the normal flow and sequence of a software tool's execution through its user interface. The software interface decimation module 220 is employed in those cases, for example, where a software services provider is attempting to find reuse case scenarios for a tool by presenting it in decimated form to naive users of similar software tools in order to annotate the software for potential reuse scenarios. Decimation proceeds based on modifications to a Graphical User Interface (GUI) and/or the code responsible for generating the GUI. The steps of decimation are recorded and utilized subsequently for reverse decimation, in which a software interface is restored to its original state in a stepwise fashion.

The presentation module 230 is an application for presenting decimated software codes and/or interfaces to two or more participants on two or more separate terminals. In an advantageous embodiment, the decimated codes and/or interfaces are presented to the participants utilizing a standard GUI.

The communication module 240 provides an instant messaging capability for allowing all the participants to communicate with each other. It should be readily apparent to those skilled in the art that conventional instant messaging techniques may be advantageously employed to implement the communication module 240.

The flow control module 250 comprises three components. The first component identifies one or more participant as the naive participant(s) and one or more participant as the informed participant(s). In one advantageous embodiment, this component may be implemented, for example, as a logon inquiry "Will you participate as the naive or informed player?" The second component of the flow control module 250 ensures that each communication consists of (i) a naive participant entering a message, (ii) an informed participant entering a message, (iii) a predetermined set of repetitions of steps (i) and (ii), and (iv) the initiation of a reversal of one step of the decimation procedure by the decimation modules described previously. The third component of the flow control module 250 determines when a session is complete, either by (i) determining that the code's and/or software interface's decimation has been completely reversed, or by (ii) an informed participant indicating that the code and/or software interface has been completed described/understood by the naive participant.

The database module 260 aggregates the communications between naive and informed participants and associates these communications with the code and/or software interface that has been the subject of the interaction of the participants. The communications may be associated in a database with the code or software as a whole, or with the portions of the code or software that most recently underwent reverse decimation at the time the communication occurred.

The search module 270 allows a user to (i) query the database with reuse descriptions, or (ii) browse the database for reuse descriptions, or (iii) browse the database for code or software. In case (iii), the code or software may be presented to the search user with annotations embedded. These annotations may be automatically extracted from the communications database and processed to provide concise descriptions of the code or software so as to make the code or software "self-describing".

Figure 3:
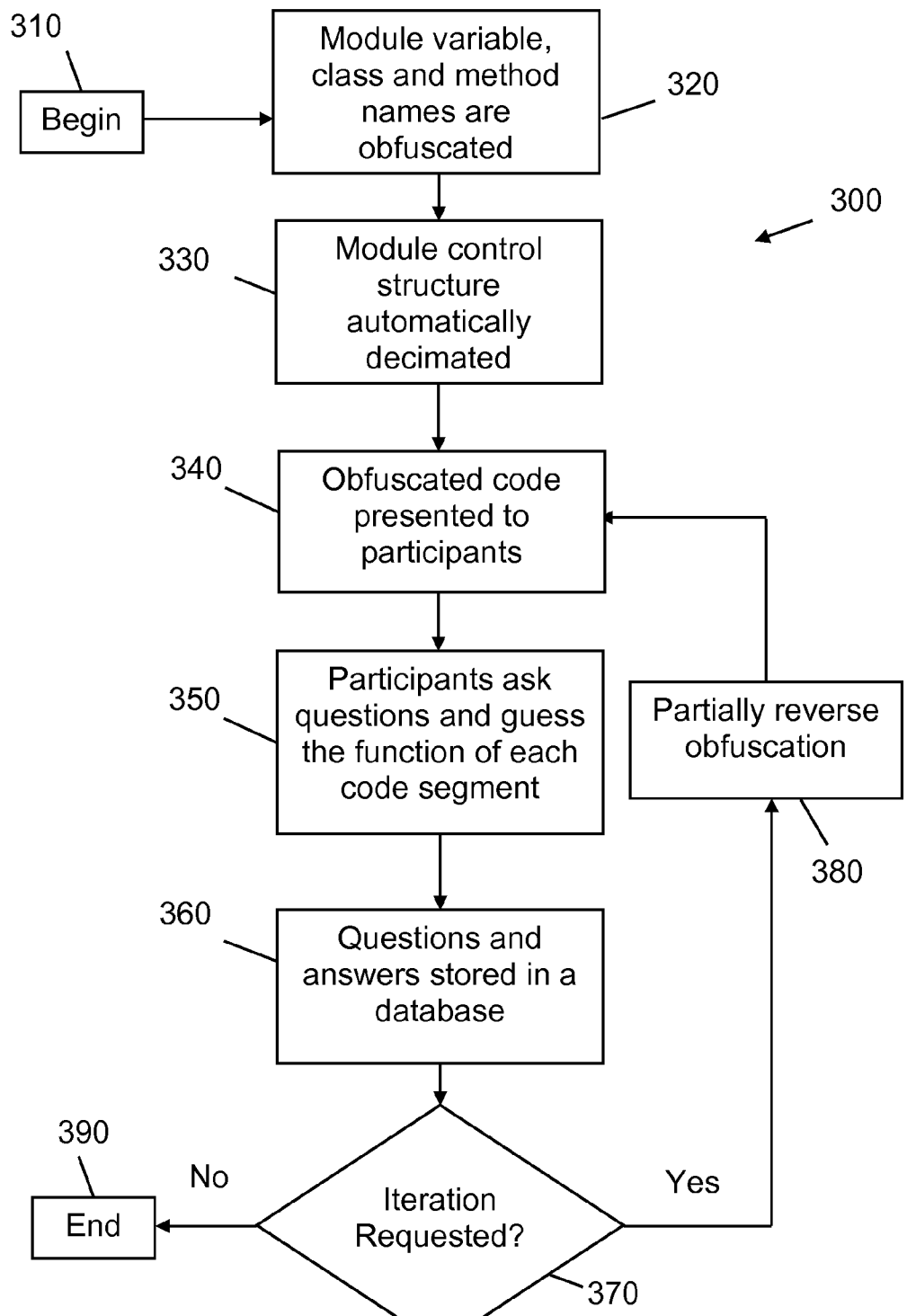
FIG. 3 illustrates a process flow of an exemplary embodiment of a software reuse annotation logic module for software reuse utilizing naive group annotation of incomplete software descriptions employing a self-reporting element according to the principles of the present invention.

Turning now to FIG. 3, with continuing reference to FIG. 2, there is depicted a process flow 300 of an exemplary embodiment of a software reuse annotation logic module for software reuse utilizing naive group annotation of incomplete software descriptions employing a self-reporting element according to the principles disclosed by the present invention.

As an illustrative scenario, consider a piece of software code whose function is to help call center employees locate images of checks recently mailed by a banking customer to a bank for deposit. This code creates a web interface, which is typically an enhanced version of the customer's own online banking web interface. In addition to viewing checks that have been written by the customer, this interface also permits the call center employee to view all scanned checks received by the bank's mail-in deposit center, then search for checks by account number, date of receipt, or amount. In an advantageous embodiment, the code is written in Java, with SQL to query a large database of scanned checks.

In preparation for identifying reuse scenarios for this code and software solution, software developers at the bank have been given, for example, a cash incentive to participate in a code annotation generation exercise. It should be noted that other nonmonetary incentives may also be advantageously employed to facilitate participation. New software developers act as naive participants, and members of the team who had worked on the code's development previously act as informed participants. With both naive and informed participants located at different terminals, the process flow 300 is initiated at a begin step 310.

Following the initiation of the process 300, the software code is automatically decimated, at an obfuscation step 320, utilizing the code decimation module 210 described hereinabove. In an advantageous embodiment, the software code's name is "name-mangled", wherein the software code's attributes, such as variable, class, and/or function names, are transformed into non-informative forms. For example, a code function name "QueryCheckImageDB" is name-mangled to become "QuipingersollQPS" to mask the function and/or purpose of the code from the naive participant(s).

Next, at a control structure decimation step 330, the control structure of the code is similarly automatically decimated, utilizing the code decimation module 210, such that the code's functional flow is interrupted by large, excised classes, functions, and code segments. It should be readily apparent to those skilled in the art that both of these decimation steps described in steps 320 and 330 may be accomplished by exploiting standard Java syntax and regenerating code based on standard Java parsing algorithms.

Subsequently, at an obfuscated code presentation step 340, the name-mangled and decimated code is presented to the naive participants utilizing the presentation module 230. It should be noted that this presentation of the obfuscated code to the participants may be accomplished, in an advantageous embodiment, by an automated system without the need for human intervention.

Following which, at an interactive question and guess step 350, the participants are required to ask questions of the informed participants and guess the presented obfuscated code's function utilizing the communication module 240 that, in an advantageous embodiment, is a conventional instant messaging interface running on the same terminal that is presenting the decimated code to the participants. During the interactive question and guess step 350 the two parties, i.e., naive and informed participants, complete a pre-determined number of information-rich exchanges between each other utilizing instant messages. The pre-determined number of information-rich exchanges is initially set prior to the initiation of the process 300 by the informed participant or, alternatively, by a higher-level policy.

All instant message communications are associated with the code and software according to (1) the software project and full software solution, and (2) the segments of the code and the software components most recently restored at the time the communication exchange was made. In this way, a database is populated, at a storing step 360, with annotations of the code and software solution as a whole, and with annotations of particular code segments, functions, variables, and classes within the code and the software components they generate. Alternatively, in another advantageous embodiment, the associate communications are stored with the software code, for example, as comments in the source code. Additionally, it should be readily apparent to those skilled in the art that a dynamically linked library or a shared object that may be loaded with the annotations during program run-time whenever the annotations are requested may also be advantageously utilized.

Next, at a decisional step 370 and utilizing the flow control module 250, the process 300 determines if one or more iteration of a process of partially reversing the obfuscation of the decimated code under review has been specified or requested. The number of iterations specified is determined by an informant participant, or alternatively, by a "higher-level" policy established for the process 300. At each iteration process, a certain percentage of the decimated code is de-obfuscated back to its original state. In another embodiment of the present invention, the informed participant may also select a particular subset of the decimated code to de-obfuscate. Alternatively, in another embodiment of the present invention, the naive participants may select a presented option to limit the number of iterations that they may be willing to participate in, including none or only one. If it is determined that no partially obfuscation reversal iteration of the code under review has been requested, the process 300 then proceeds to terminate at an end step 390.

On the other hand, if it is determined that one or more partially obfuscation reversal iteration of the code under review has been requested, the process 300 proceeds to a partially reverse obfuscation step 380 wherein the obfuscated code under review is partially restored to its original state. In the partially reverse obfuscation step 380, the process 300 automatically reverses a portion of the decimation procedure and restores, for example, a code segment, a function, or a class, or restores the original name for a variable, class, or function that has undergone name-mangling based on the parameters previously specified by the informed participant.

Following reverse decimation at the partially reverse obfuscation step 380, the partially reverse obfuscated code is then passed back to the obfuscated code presentation step 340 for presentation back to the naive participants to continue the process 300. This sub-process of steps 340 through 380 of iteratively partially reversing the decimation of the code under review continues until it is determined at the decisional step 370 that the specified number of iterations requested earlier has been performed, at which time, the process 300 proceeds to termination at the end step 390.

At the conclusion of the process 300, the software development department of the bank, utilizing the search module 270, may query the database for code to reuse in a different project whose aim is to develop a software solution allowing online banking customers to scan checks for deposit at home, enter check images into a web interface, and transfer these deposits to a customer service agent on the phone. By searching the database, for example, with such queries as "query image", "web interface", "image entry", "check deposits", and "digit recognition", the code is immediately located. Utilizing the code's self-describing faculty (derived from all communication information associated with this code), the software developers are able to rapidly understand its use cases, and with minor modification, reuse it in their current project.

The process flow and block diagrams in the FIGS. 1-3 hereinabove illustrate the architecture, functionality, and operation of possible implementations of systems, methods and computer program products according to various embodiments of the present invention, wherein a computer program product comprises a computer readable storage device storing program instructions for execution by the processor 124 via a memory (e.g., RAM) of the data processing system 100 (FIG. 1). In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present invention has been presented for purposes of illustration and description, and is not intended to be exhaustive or limited to the invention in the form disclosed. Many modifications and variations will be apparent to those of ordinary skill in the art. The embodiments were chosen and described hereinabove in order to best explain the principles of the invention, the practical application, and to enable others of ordinary skill in the art to understand the invention for various embodiments with various modifications as are suited to the particular use contemplated.

What is claimed is:

1. A method for reuse of a software code, the method comprising the steps of:
   (a) a processor of a computer system obfuscating the software code from an original state of the software code;
   (b) presenting the obfuscated software code to a first participant and a second participant;
   (c) collecting communications between the first participant and the second participant, wherein the communications comprise questions about the obfuscated software code posed by the first participant to the second participant, answers provided by the second participant to the questions, and guesses by the first participant of a functionality of the obfuscated software code;
   (d) the processor generating associations between the collected communications and respective portions of the obfuscated software code;

(e) storing the generated associations in a database of the computer system;

(f) after the storing, the processor determining that the second participant has not indicated that the first participant understands the obfuscated software code, and in response, partially reversing the obfuscated software code to transform the obfuscated software code to a partially obfuscated software code that is closer to the original state of the software code than the obfuscated software code generated in step (a), and repeating steps (b), (c), (d) and (e) with the partially obfuscated software code instead of the obfuscated software code generated in step (a); and (g) after the partially reversing in step (f), the processor determining if the second participant has indicated that the first participant understands the partially obfuscated software code, and if not, further reversing the partially obfuscated software code to transform the partially obfuscated software code to the original state of the software code or closer to the original state of the software code than the partially obfuscated software code generated in step (f), and repeating steps (b), (c), (d) and (e) with the further reversed partially obfuscated software code instead of the partially obfuscated software code generated in step (f).

2. The method of claim 1, wherein the obfuscating in step (a) comprises obfuscating a control structure of the software code.

3. The method of claim 1, wherein the obfuscating the software code in step (a) comprises obfuscating attributes of the software code into non-informative forms, and wherein the obfuscated attributes of the software code include variable, class, method names, or combinations thereof.

4. The method of claim 1, wherein the obfuscating in step (a) interrupts a functional flow of the software code via excision of classes, functions, code segments, or combinations thereof.

5. The method of claim 1, wherein the respective portions of the software code comprise code segments, functions, variables, classes, or combinations thereof.

6. The method of claim 1, wherein in step (g) the determining determines that the second participant has not indicated that the first participant understands the partially obfuscated software code, and wherein the further reversing transforms the partially obfuscated software code to the original state of the software code.

7. The method of claim 1, wherein in step (g) the determining determines that the second participant has not indicated that the first participant understands the partially obfuscated software code, and wherein the further reversing transforms the partially obfuscated software code closer to the original state of the software code than the partially obfuscated software code generated in step (f).

8. A computer program product for reuse of a software code, the computer program product comprising:

a computer readable memory device;

first program instructions to obfuscate the software code from an original state of the software code;

second program instructions to present the obfuscated software code to a first participant and a second participant;

third program instructions to collect communications between the first participant and the second participant, wherein the communications comprise questions about the obfuscated software code posed by the first participant and the second participant, answers provided by the second participant to the questions, and guesses by the first participant of a functionality of the obfuscated software code;

fourth program instructions to generate associations between the collected communications and respective portions of the software code;

fifth program instructions to store the generated associations in a database of the computer system;

sixth program instructions to, after the generated associations are stored, determine that the second participant has not indicated that the first participant understands the obfuscated software code, and in response, to partially reverse the obfuscated software code to transform the obfuscated software code to a partially obfuscated software code that is closer to the original state of the software code than the obfuscated code generated by first program instructions, and to process, by the second, third, fourth, and fifth program instructions, the partially obfuscated software code instead of the obfuscated software code generated by the first program instructions; and seventh program instructions to, after the obfuscated software code is partially reversed, determine if the second participant has indicated that the first participant understands the partially reversed obfuscated software code, and if not, to further reverse the partially obfuscated software code to transform the partially obfuscated software code to the original state of the software code or closer to the original state of the software code than the partially obfuscated software code generated by the sixth program instructions, and to process, by the second, third, fourth, and fifth program instructions, the further reversed partially obfuscated software code instead of the partially obfuscated software code generated by the sixth program instructions, wherein the first program instructions, the second program instructions, the third program instructions, the fourth program instructions, the fifth program instructions, the sixth program instructions, and the seventh program instructions are stored on the memory device for execution by a processor of a computer system.

9. The computer program product of claim 8, wherein the first program instructions to obfuscate the software code comprises program instructions to obfuscate a control structure of the software code.

10. The computer program product of claim 8, wherein the first program instructions to obfuscate the software code comprises program instructions to obfuscate attributes of the software code into non-informative forms, and wherein the obfuscated attributes of the software code include variable, class, method name, or combinations thereof.

11. The computer program product of claim 8, wherein the first program instructions to obfuscate the software code interrupts a functional flow of the software code via excision of classes, functions, code segments, or combinations thereof.

12. The computer program product of claim 8, wherein the respective portions of the software code comprise code segments, functions, variables, classes, or combinations thereof.

13. The computer program product of claim 8, wherein the seventh program instructions to determine comprises program instructions to determine that the second participant has not indicated that the first participant understands the partially obfuscated software code, and wherein the further reversing transforms the partially obfuscated software code to the original state of the software code.

14. The computer program product of claim 8, wherein the seventh program instructions to determine comprises program instructions to determine that the second participant has not indicated that the first participant understands the partially obfuscated software code, and wherein the further reversing transforms the partially obfuscated software code closer to the original state of the software code than the partially obfuscated software code generated by the sixth program instructions.

15. A computer system for reuse of a software code, the computer system comprising:
   a processor;
   a computer readable storage device;
   a computer readable memory;
   first program instructions to obfuscate the software code from an original state of the software code;
   second program instructions to present the obfuscated software code to a first participant and a second participant;
   third program instructions to collect communications between the first participant and the second participant, wherein the communications comprise questions about the obfuscated software code posed by the first participant and the second participant, answers provided by the second participant to the questions, and guesses by the first participant of a functionality of the obfuscated software code;
   fourth program instructions to generate associations between the collected communications and respective portions of the software code;
   fifth program instructions to store the generated associations in a database of the computer system;
   sixth program instructions to, after the generated associations are stored, determine that the second participant has not indicated that the first participant understands the obfuscated software code, and in response, to partially reverse the obfuscated software code to transform the obfuscated software code to a partially obfuscated software code that is closer to the original state of the software code than the obfuscated code generated by first program instructions, and to process, by the second, third, fourth, and fifth program instructions, the partially obfuscated software code instead of the obfuscated software code generated by the first program instructions; and
   seventh program instructions to, after the obfuscated software code is partially reversed, determine if the second participant has indicated that the first participant understands the partially reversed obfuscated software code, and if not, to further reverse the partially obfuscated software code to transform the partially obfuscated software code to the original state of the software code or closer to the original state of the software code than the partially obfuscated software code generated by the sixth program instructions, and to process, by the second, third, fourth, and fifth program instructions, the further reversed partially obfuscated software code instead of the partially obfuscated software code generated by the sixth program instructions,
   wherein the first program instructions, the second program instructions, the third program instructions, the fourth program instructions, the fifth program instructions, the sixth program instructions, and the seventh program instructions are stored on the computer readable storage device for execution by the processor via the memory.

16. The computer system of claim 15, wherein the first program instructions to obfuscate the software code comprises program instructions to obfuscate a control structure of the software code.

17. The computer system of claim 15, wherein the first program instructions to obfuscate the software code comprises program instructions to obfuscate attributes of the software code into non-informative forms, and wherein the obfuscated attributes of the software code include variable, class, method name, or combinations thereof.

18. The computer system of claim 15, wherein the first program instructions to obfuscate the software code comprises program instructions to obfuscate attributes of the software code into non-informative forms, and wherein the obfuscated attributes of the software code include variable, class, method name, or combinations thereof.

19. The computer system of claim 15, wherein the seventh program instructions to determine comprises program instructions to determine that the second participant has not indicated that the first participant understands the partially obfuscated software code, and wherein the further reversing transforms the partially obfuscated software code to the original state of the software code.

20. The computer system of claim 15, wherein the seventh program instructions to determine comprises program instructions to determine that the second participant has not indicated that the first participant understands the partially obfuscated software code, and wherein the further reversing transforms the partially obfuscated software code closer to the original state of the software code than the partially obfuscated software code generated by the sixth program instructions.

* * * * *